April 7, 1959  T. J. BAGAROZY  2,880,664
COFFEE MAKING APPARATUS
Filed Jan. 23, 1957  3 Sheets-Sheet 1
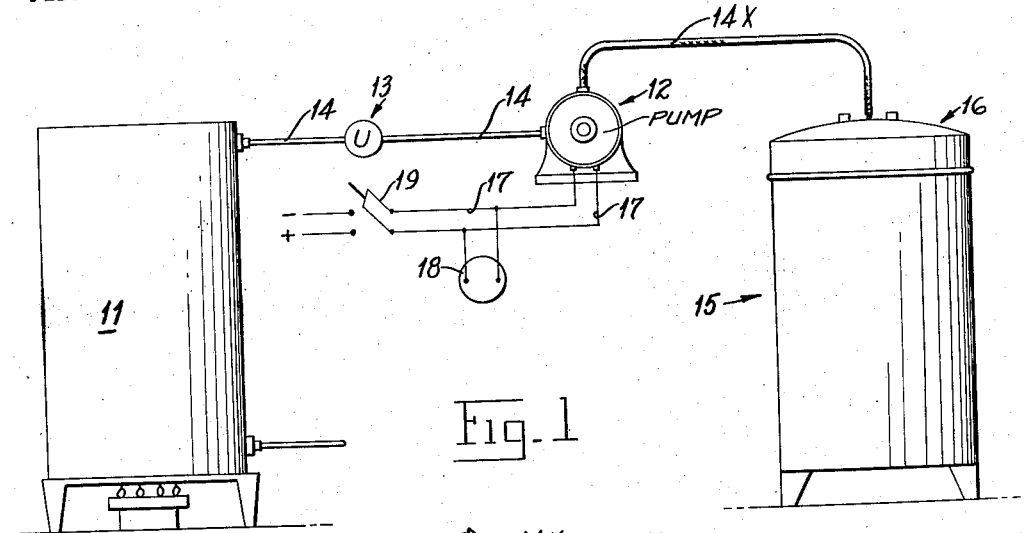
Fig. 1
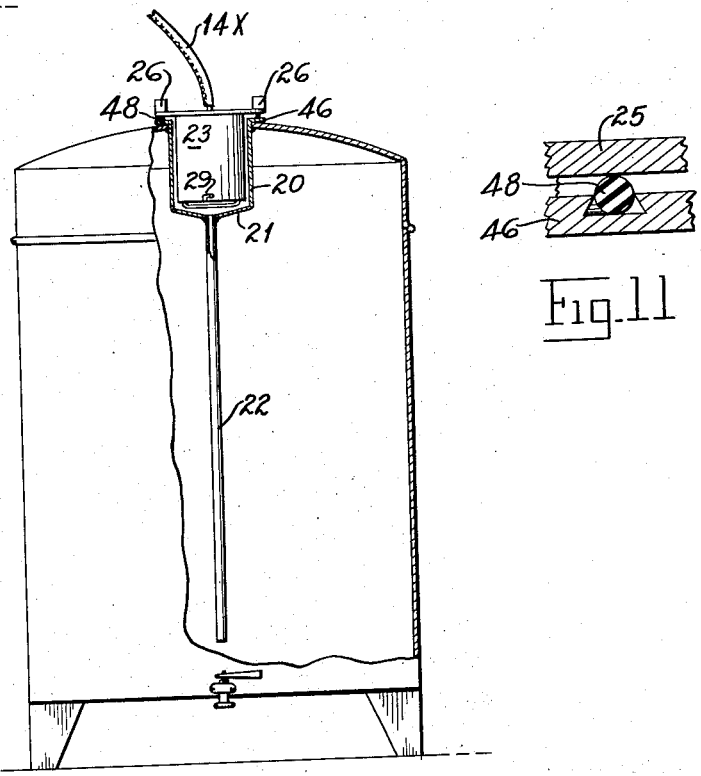
Fig. 2
Fig. 11
INVENTOR.
TULLY J. BAGAROZY
BY Frank Makara
ATTORNEY April 7, 1959 — T. J. BAGAROZY — 2,880,664
COFFEE MAKING APPARATUS
Filed Jan. 23, 1957 — 3 Sheets-Sheet 2

INVENTOR.
TULLY J. BAGAROZY
BY Frank Makara
ATTORNEY

April 7, 1959   T. J. BAGAROZY   2,880,664
COFFEE MAKING APPARATUS
Filed Jan. 23, 1957   3 Sheets-Sheet 3
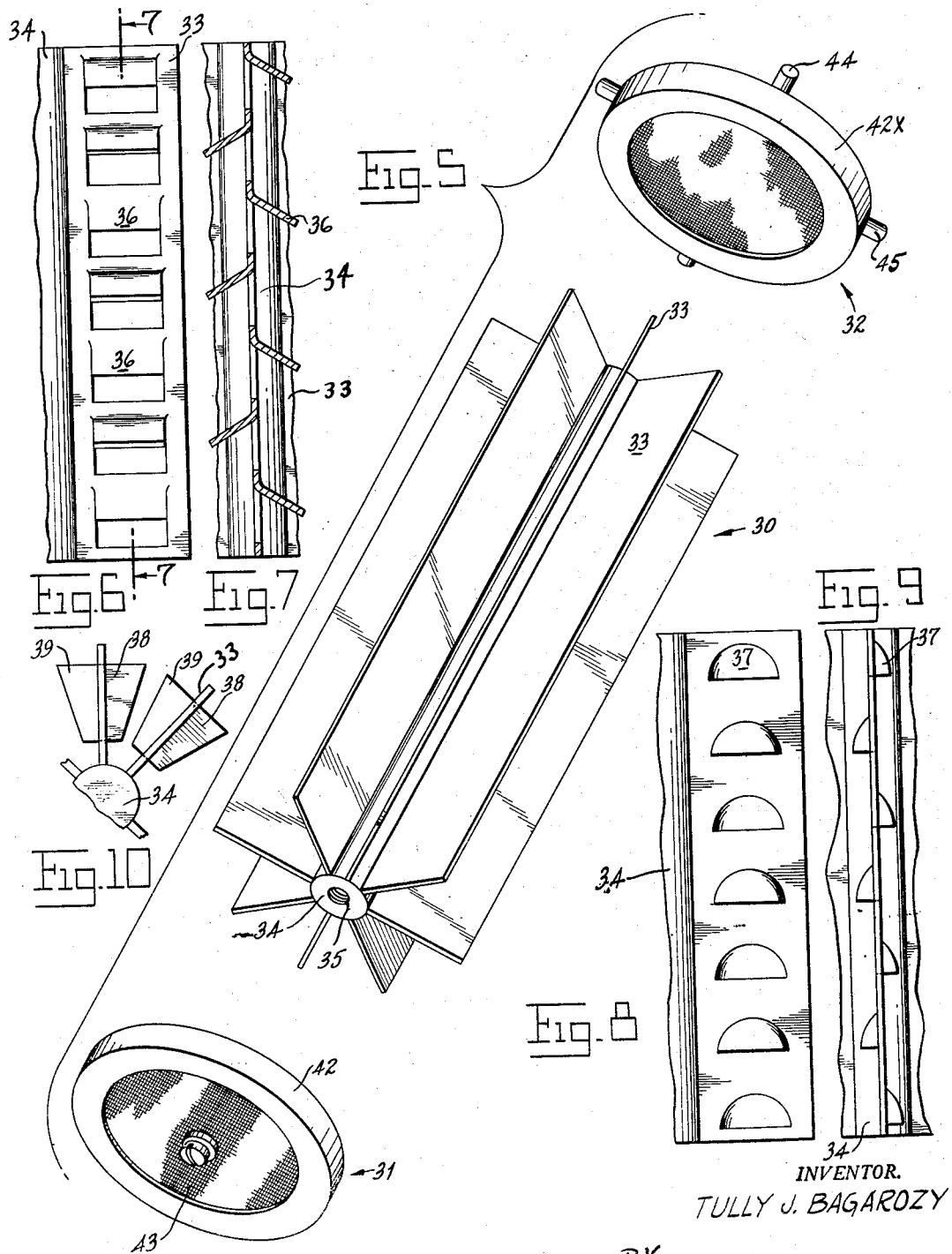
INVENTOR.
TULLY J. BAGAROZY
BY Frank Makara
Attorney

United States Patent Office

2,880,664
Patented Apr. 7, 1959

2,880,664

COFFEE MAKING APPARATUS

Tully J. Bagarozy, Elizabeth, N.J., assignor, by mesne assignments, to Bamm Corporation, Dover, Del., a corporation of Delaware Application January 23, 1957, Serial No. 635,913

4 Claims. (Cl. 99—302)

This invention relates to a coffee making apparatus and process.

Most coffee making devices or procedures employed to make potable coffee are wasteful in that they fail to extract all or substantially all the beneficial desired ingredients from the ground roasted bean.

It is an object of this invention to provide an apparatus for rapidly and efficiently extracting all or substantially all the desired coffee bean ingredients in a minimum amount of time.

It is another purpose of this invention to provide a new process for extracting ground coffee.

Figure 3:
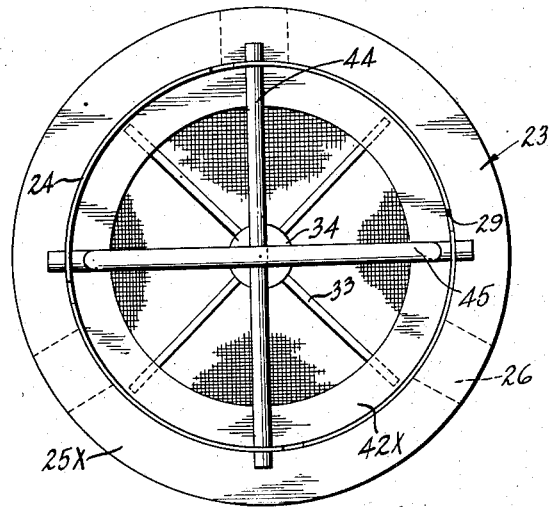
Figure 4:
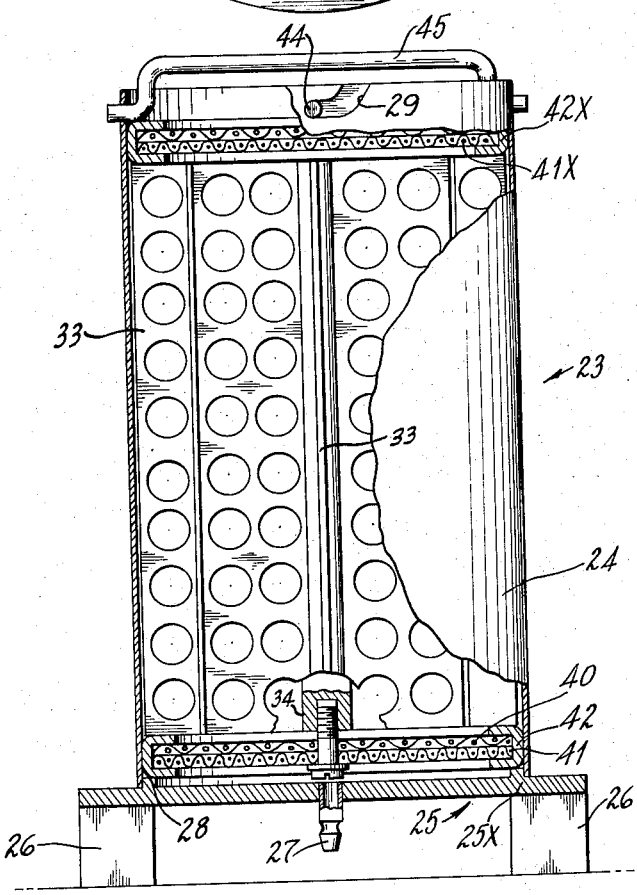

These and other objectives of this invention will be found upon reading the following descriptive disclosure taken in conjunction with the accompanying drawing in which:

Fig. 1 is a general view of the coffee making apparatus,

Fig. 2 is a view, broken away in part of the interior of a coffee urn simplified by omitting the conventional hot water jacket, Fig. 3 is a top view of the removed coffee container, Fig. 4 is a side view, partly in section and broken away in part, of the coffee container of Fig. 3 showing the multi-vaned separator therein, Fig. 5 is an exploded view showing the end strainers and the centrally disposed multi-vaned separator, Fig. 6 is an elevation view of a modified vane having flanged slots, Fig. 7 is a view taken on line 7—7 of Fig. 6, Fig. 8 is a front view of a modified vane having scoop slots, Fig. 9 is a side view of the vane of Fig. 8, Fig. 10 is a top view of another modified vane having curved flanges in lieu of the rectangular flanges of Fig. 6, and Fig. 11 is a detail view in section showing the manner of removeably vapor sealing the coffee containing unit to the outside wall of the coffee urn top.

Turning to the drawing and particularly to Fig. 1, the hot water used to make potable coffee is pumped from the hot water supply tank 11 by a conventional centrifugal pump 12 through a conventional valve 13 and conventional stainless steel pipe 14 and conventional flexible pipe 14X into conventional coffee making urn 15 having a modified dome 16.

According to this invention the ground coffee is extracted with hot water under pressure for example nine pounds of pressure. Preferably the ground coffee is extracted both in a vertical and lateral manner simultaneously to rapidly impregnate and extract the ground coffee particles.

The pump is energized from an electrical source through electrical conduits 17 across the lines of which is attached electrically an electrical timer 18 of conventional manufacture. In the operation of this coffee making device the valve 13 is opened and the switch 19 is closed thereby starting the pump 12 and timer 18. The pump 12 has a standard output of about one-third gallon per minute. Thus to fill an eight gallon urn the timer is set for 24 minutes. At the end of the 24 minute interval the timer rings and the operator turns off the pump 12 by opening switch 19 and then closes valve 13.

Turning now to Fig. 2 showing a simplified coffee urn, which for purposes of simplification has no water jacket, the conventional urn dome is modified by cutting an aperture therein, and securing fixedly, as by welding, a cylindrical container 20 having a rounded bottom 21 having an aperture therein to the edges of which a vertical conduit 22 is welded. The conduit 22 is of suitable length and terminates in space relationship to the bottom of the urn.

An important feature of this invention is the coffee holder 23 and the manner in which it functions. The holder 23 is a removeable assembled unit which fits into container 20 (Fig. 2) and comprises a cylindrical vessel 24 of suitable diameter to fit into container 20, having a circular end plate 25 fixedly secured to one end as by welding. The end plate 25 extends beyond the vessel 24 walls a suitable distance 25X, and a plurality of at least 3 handles 26 are secured to the plate 25, said handles functioning also as legs upon which to stand the coffee holder 23 in order to fill it with ground coffee.

The plate 23 is provided with a centrally disposed pipe conduit 26 having a conventional integral quick attachment nipple 27. Flexible pipe 14X is provided with a co-acting conventional nipple receiver so that quick attachment of flexible pipe 14X to nipple 27 may be made.

End plate 25 is provided interiorly of vessel 24 with an integral ring 28. At the opposite end to that of the end plate 25, the vessel 24 is provided with four bayonet slots 29.

The coffee holder 23 is provided with a removeable multi-vaned, for example eight vaned, separator 30 having a removeable bottom screen end element 31 and a removeable top screen end element 32 (Fig. 5).

The vanes 33 of stainless steel, as preferably are all the metal parts of this apparatus, are radially secured as by welding to a central rod 34 having a screw threaded cavity 35 in its bottom. The vanes 33 are of a size to closely approach the interior wall of vessel 24. The vanes form compartments for holding ground coffee.

The vanes 33 may be non-perforated or circular perforated but preferably they are slotted having a flange 36 over the slot top (Fig. 6). In lieu of slots the perforations may be slits having scoops 37. The flanges 36 or scoops 37 are made in the vanes by conventional manufacturing procedures and are disposed in alternate relationship down the vane length. The purpose of the slots and slits is to divert some of the downward or vertical flow of hot water in coffee holder 23 (Figs. 2 and 4) into its interior and also the adjacent compartment thereby giving it a lateral direction.

Thus the ground coffee is extracted not only by vertical flow of hot water but simultaneously by lateral flow of hot water, and not only within a single compartment but compartment to compartment lateral extraction is had.

In order to divert the hot water flowing vertically downward along the vane surfaces into the center of the compartments, the flanges are cut in a trapezoidal shape 38 with the widest end 39 disposed furtherest away from rod 34 (Fig. 10).

The bottom screen 31 is made from a large mesh inner round screen 40 over which is a small mesh round screen 41, bordered with a U-channel rim 42 and held therein by spot welding. Bottom screen 31 is disposed uppermost in the urn (Fig. 2), being in fact the bottom most screen only during the filling of the coffee holder 23 with ground coffee.

Bottom screen 31 is provided with a central aperture through rough mesh screens 40 and 41. A flanged screw 43 is disposed through the apertures of screen 40 and 41 and secured in cavity 35 of rod 34 thereby securing the bottom screen 31 firmly to the separator 30.

In loading the coffee holder 23 the separator 30 with the bottom screen 31 secured thereto is lowered into the vessel 24 (Fig. 4) and the ground coffee is then poured into the many compartments to fill them. When the vanes are provided with circular perforations or slots or slits the coffee of one compartment commingles and contacts with the coffee of both of its adjacent compartments.

After the separator compartments are filled the top screen 32 is placed upon the separator. The top screen 32 is constructed similarly to the bottom screen 31 but with the smaller mesh 41X innermost. The top screen 32 is provided with a pair of crossed bars namely a bottom bar 44 and a top U-shaped handle bar 45. The ends of the bars 44 and 45 are welded to the U-channel 42X and protrude suitably therebeyond so that they may engage the bayonet slots 29 (Fig. 4) thereby locking the top screen 32 to the coffee holder 23.

After the top screen is secured to the coffee holder vessel 24 the unit is turned over and placed into container 20 and the flexible conduit 14X is attached to nipple 27.

As shown in Fig. 2, container 20 is provided with a circular flange 46 which rests upon the urn dome wall 16 and is secured thereto by welding. A circular groove 47 of trapezoidal cross-section is provided in the circular flange 46 and a resilient sealer ring 48 is disposed therein with about one-third of the ring protruding above the groove 47.

The weight of the coffee holder effects an air tight seal between the holder 23 and the container 20 flange 46 thereby preventing loss of coffee aroma to the atmosphere.

In the operation of this coffee making device the ground coffee is impregnated with hot water under pressure and the coffee particles are extracted by downward and lateral flow of the hot water. Thus the process of this invention is one of pressure extraction using mixed vertical and lateral flow of the pressurized liquid to extra the coffee particles rapidly and most efficiently thereby effecting maximum extraction of coffee to yield the maximum amount of potable coffee solution.

Modifications of the apparatus are feasible without departing from the main contributive teaching or invention. Thus, for example, conduit 22 may be provided with a closed bottom but with lateral apertures disposed in the conduit adjacent the closed bottom thereby effecting a lateral turbulent mixing of the coffee solution flowing through conduit 22 with the coffee solution already in the urn.

This invention is thus of generic scope and not to be limited to the illustrative embodiments herein shown and described as pressures of 8 to 10 pounds and others may be used in lieu of 9 pounds of pressure, etc.

Also this invention may be made fully automatic by providing an electrically operated valve 13 and connecting it electrically to the conduits 17.

Also in lieu of a centrifugal pump 12 a conventional fluid metering pump may be used, and for example the metering pump may be set to pump three gallons of hot water per minute.

I claim:

1. An extractor for extracting comminuted material under liqiud pressure comprising a tubular cylindrical element open at both ends, a vertical separator element having a solid central core disposed in said cylindrical element, a plurality of vertical radially disposed walls secured integrally to said core and extending to the cylindrical element thereby dividing the space of the cylindrical element into a plurality of equal volume compartments, said vertical separator walls having a plurality of linearly disposed apertures therein, an angularly disposed flange integral with said radial wall disposed slopingly over each of said apertures, a circular screen, filter element disposed adjacent each end of said separator and contactingly against the inner surface of said cylindrical element, means for securing each of said filter elements in place against said respective ends of said separator, and means secured to the top end of said extractor for introducing fluid to fall upon the top filter screen and then evenly into the plurality of compartments, said falling stream of fluid being directed by said flanges over said apertures of said radial walls from one compartment to its adjacent compartment thereby effecting a vertical and a lateral washing of the comminuted material disposed in said compartments.

2. The extractor of claim 1 wherein the apertures of said radial walls are rectangular and wherein said flanges over said apertures are rectangular and disposed linearly in alternate relationship first to one side of a radial wall and then to the other side of said radial wall.

3. The extractor of claim 1 wherein the flanges are quadrant scoops thereby forming in effect horizontal apertures in said radial walls of said extractor.

4. In combination the extractor of claim 1 and a conventional hot water coffee urn, said extractor being disposed in the conventional cover of said urn.

References Cited in the file of this patent

UNITED STATES PATENTS

| | | |
|---|---|---|
| 313,469 | Byler | Mar. 10, 1885 |
| 427,568 | Halstead | May 13, 1890 |
| 607,409 | Falardeau | July 12, 1898 |
| 1,385,265 | Olson | July 19, 1921 |
| 1,528,601 | Bozzalla | Mar. 3, 1925 |
| 1,571,752 | Chamberlain | Feb. 2, 1926 |
| 1,736,265 | Kelly | Nov. 19, 1929 |
| 1,774,980 | Lambert | Sept. 2, 1930 |
| 2,064,214 | Merkle | Dec. 15, 1936 |
| 2,515,730 | Ornfelt | July 18, 1950 |
| 2,629,663 | Fogler et al. | Feb. 24, 1953 |

FOREIGN PATENTS

| | | |
|---|---|---|
| 344,183 | France | Aug. 27, 1904 |
| 385,230 | France | Mar. 7, 1908 |
| 474,548 | Germany | Apr. 5, 1929 |